US010474641B2

(12) United States Patent
Pudipeddi et al.

(10) Patent No.: US 10,474,641 B2
(45) Date of Patent: *Nov. 12, 2019

(54) EXTENSIBLE FILE SYSTEM

(71) Applicant: Microsoft Technology Licensing, LLC, Redmond, WA (US)

(72) Inventors: Ravisankar V. Pudipeddi, Redmond, WA (US); Vishal V. Ghotge, Seattle, WA (US); Sarosh C. Havewala, Redmond, WA (US); Ravinder S. Thind, Sammamish, WA (US); Mark J. Zbikowski, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/397,093

(22) Filed: Jan. 3, 2017

(65) Prior Publication Data
US 2017/0132246 A1    May 11, 2017

Related U.S. Application Data

(60) Continuation of application No. 12/493,172, filed on Jun. 27, 2009, now Pat. No. 9,575,988, which is a
(Continued)

(51) Int. Cl.
*G06F 17/30* (2006.01)
*G06F 16/178* (2019.01)
(Continued)

(52) U.S. Cl.
CPC .......... *G06F 16/1794* (2019.01); *G06F 16/13* (2019.01); *G06F 16/164* (2019.01)

(58) Field of Classification Search
CPC .................................................. G06F 17/30179
See application file for complete search history.

(56) References Cited

U.S. PATENT DOCUMENTS 4,780,821 A    10/1988  Crossley
4,987,531 A     1/1991  Nishikado et al.
(Continued)

FOREIGN PATENT DOCUMENTS

AU    2005229678 B2    11/2010
CN       1477518 A     2/2004
(Continued)

OTHER PUBLICATIONS

John F. Karpovich, Andrew S. Grimshaw, James C. French. Extensible file system (ELFS): an object-oriented approach to high performance file I/O, Oct. 1994, pp. 191-204.*
(Continued)

*Primary Examiner* — Mark D Featherstone
*Assistant Examiner* — Tony Wu
(74) *Attorney, Agent, or Firm* — BakerHostetler

(57) ABSTRACT

An extensible file system format for portable storage media is provided. The extensible file system format includes the specification of primary and secondary directory entry types that may be custom defined. The primary and secondary directory entry types can be further classified as critical and benign directory entries.

6 Claims, 6 Drawing Sheets

Related U.S. Application Data division of application No. 11/229,485, filed on Sep. 16, 2005, now Pat. No. 9,639,554.

(60) Provisional application No. 60/637,407, filed on Dec. 17, 2004.

(51) Int. Cl.
 *G06F 16/13* (2019.01)
 *G06F 16/16* (2019.01)

(56) References Cited

U.S. PATENT DOCUMENTS

| | | |
|---|---|---|
| 5,083,264 A | 1/1992 | Platteter et al. |
| 5,086,502 A | 2/1992 | Malcolm |
| 5,201,044 A | 4/1993 | Frey, Jr. et al. |
| 5,202,982 A | 4/1993 | Gramlich et al. |
| 5,297,148 A | 3/1994 | Harari et al. |
| 5,307,494 A | 4/1994 | Yasumatsu et al. |
| 5,313,646 A | 5/1994 | Hendricks et al. |
| 5,359,725 A | 10/1994 | Garcia et al. |
| 5,363,487 A | 11/1994 | Willman et al. |
| 5,367,671 A | 11/1994 | Feigenbaum et al. |
| 5,371,885 A | 12/1994 | Letwin |
| 5,388,257 A | 2/1995 | Bauer |
| 5,392,427 A | 2/1995 | Barrett et al. |
| 5,412,808 A | 5/1995 | Bauer |
| 5,421,001 A | 5/1995 | Methe |
| 5,434,974 A | 7/1995 | Loucks et al. |
| 5,437,029 A | 7/1995 | Sinha |
| 5,469,562 A | 11/1995 | Saether |
| 5,483,652 A | 1/1996 | Sudama et al. |
| 5,535,375 A | 7/1996 | Eshel et al. |
| 5,537,636 A | 7/1996 | Uchida et al. |
| 5,546,389 A | 8/1996 | Wippenbeck et al. |
| 5,574,907 A | 11/1996 | Jerniga et al. |
| 5,579,517 A | 11/1996 | Reynolds et al. |
| 5,596,755 A | 1/1997 | Pletcher et al. |
| 5,627,996 A | 5/1997 | Bauer |
| 5,694,606 A | 12/1997 | Pletcher et al. |
| 5,699,548 A | 12/1997 | Choudhury et al. |
| 5,732,268 A | 3/1998 | Bizzarri |
| 5,734,340 A | 3/1998 | Kennedy |
| 5,745,752 A | 4/1998 | Hurvig et al. |
| 5,745,902 A | 4/1998 | Miller et al. |
| 5,754,848 A | 5/1998 | Hanes |
| 5,758,352 A | 5/1998 | Reynolds et al. |
| 5,761,675 A | 6/1998 | Isenberg |
| 5,761,677 A | 6/1998 | Senator et al. |
| 5,765,169 A | 6/1998 | Conner |
| 5,778,168 A | 7/1998 | Fuller |
| 5,813,011 A | 9/1998 | Yoshida et al. |
| 5,819,275 A | 10/1998 | Badger et al. |
| 5,825,734 A | 10/1998 | Igarashi et al. |
| 5,832,515 A | 11/1998 | Ledain et al. |
| 5,850,506 A | 12/1998 | Gordons |
| 5,898,868 A | 4/1999 | Krueger et al. |
| 5,907,672 A | 5/1999 | Matze et al. |
| 5,923,884 A | 7/1999 | Peyret et al. |
| 5,926,805 A | 7/1999 | Hurvig et al. |
| 5,930,828 A | 7/1999 | Jensen et al. |
| 5,968,127 A | 10/1999 | Kawabe et al. |
| 5,983,240 A | 11/1999 | Shoroff et al. |
| 6,023,744 A | 2/2000 | Shoroff et al. |
| 6,032,223 A | 2/2000 | Beelitz |
| 6,037,738 A | 3/2000 | Morita et al. |
| 6,038,636 A | 3/2000 | Brown, III et al. |
| 6,049,807 A | 4/2000 | Carroll et al. |
| 6,055,527 A | 4/2000 | Badger et al. |
| 6,078,999 A | 6/2000 | Raju et al. |
| 6,081,804 A | 6/2000 | Smith |
| 6,108,759 A | 8/2000 | Orcutt et al. |
| 6,144,969 A | 11/2000 | Inokuchi et al. |
| 6,192,432 B1 | 2/2001 | Slivka et al. |
| 6,194,432 B1 | 2/2001 | Sheftell et al. |
| 6,205,558 B1 | 3/2001 | Sobel |
| 6,253,300 B1 | 6/2001 | Lawrence et al. |
| 6,286,013 B1 | 9/2001 | Reynolds et al. |
| 6,286,113 B1 | 9/2001 | Sembach et al. |
| 6,374,265 B1 * | 4/2002 | Chen ............... G06F 11/1435 |
| 6,374,268 B1 | 4/2002 | Testardi |
| 6,377,958 B1 | 4/2002 | Orcutt |
| 6,378,031 B1 | 4/2002 | Kuno et al. |
| 6,427,123 B1 | 7/2002 | Sedlar et al. |
| 6,470,345 B1 | 10/2002 | Doutre et al. |
| 6,510,552 B1 | 1/2003 | Benayoun et al. |
| 6,529,966 B1 | 3/2003 | Willman et al. |
| 6,571,259 B1 | 5/2003 | Zheng et al. |
| 6,594,725 B2 | 7/2003 | Ando et al. |
| 6,611,907 B1 | 8/2003 | Maeda et al. |
| 6,612,490 B1 | 9/2003 | Herrendoerfer et al. |
| 6,615,365 B1 | 9/2003 | Jenevein et al. |
| 6,615,404 B1 | 9/2003 | Garfunkel et al. |
| 6,654,772 B1 | 11/2003 | Crow et al. |
| 6,658,437 B1 | 12/2003 | Lehman |
| 6,662,309 B2 | 12/2003 | Ando et al. |
| 6,675,180 B2 | 1/2004 | Yamashita |
| 6,754,696 B1 | 6/2004 | Kamath et al. |
| 6,792,518 B2 | 9/2004 | Armangau et al. |
| 6,856,993 B1 | 2/2005 | Verma et al. |
| 6,883,114 B2 | 4/2005 | Lasser |
| 6,907,184 B1 | 6/2005 | Yokota et al. |
| 6,922,708 B1 | 7/2005 | Sedlar |
| 6,972,518 B2 | 12/2005 | Heimgartner et al. |
| 7,032,107 B2 | 4/2006 | Stutton et al. |
| 7,051,251 B2 | 5/2006 | Moore et al. |
| 7,062,602 B1 | 6/2006 | Moore et al. |
| 7,072,917 B2 | 7/2006 | Wong et al. |
| 7,089,448 B2 | 8/2006 | Hinshaw et al. |
| 7,092,870 B1 | 8/2006 | Chen et al. |
| 7,174,420 B2 | 2/2007 | Malueg et al. |
| 7,274,857 B2 | 9/2007 | Nallur et al. |
| 7,363,540 B2 | 4/2008 | Patel et al. |
| 7,380,140 B1 | 5/2008 | Weissman et al. |
| 7,380,157 B2 | 5/2008 | Brewer et al. |
| 7,383,288 B2 | 6/2008 | Miloushev et al. |
| 7,493,445 B2 | 2/2009 | Harada |
| 7,613,738 B2 | 11/2009 | Patel et al. |
| 7,620,620 B1 * | 11/2009 | Sedlar ............... G06F 17/30233 |
| 7,676,491 B2 | 3/2010 | Jansen et al. |
| 7,685,171 B1 | 3/2010 | Beaverson et al. |
| 7,747,664 B2 | 6/2010 | Patel et al. |
| 7,757,100 B2 | 7/2010 | Weissman et al. |
| 7,873,596 B2 | 1/2011 | Pudipeddi et al. |
| 7,941,435 B2 | 5/2011 | Kao et al. |
| 7,979,409 B2 | 7/2011 | Kime |
| 8,001,165 B2 | 8/2011 | Patel et al. |
| 8,024,383 B2 | 9/2011 | Patel et al. |
| 8,024,507 B2 | 9/2011 | Patel et al. |
| 8,156,165 B2 | 4/2012 | Malueg et al. |
| 8,321,439 B2 | 11/2012 | Pudipeddi et al. |
| 8,352,697 B2 | 1/2013 | Lasser |
| 8,364,732 B2 | 1/2013 | Pudipeddi et al. |
| 8,433,677 B2 | 4/2013 | Pudipeddi et al. |
| 8,452,729 B2 | 5/2013 | Pudipeddi et al. |
| 8,583,708 B2 | 11/2013 | Pudipeddi et al. |
| 8,606,830 B2 | 12/2013 | Pudipeddi et al. |
| 8,725,772 B2 | 5/2014 | Pudipeddi et al. |
| 2001/0016841 A1 | 8/2001 | Karasudani |
| 2001/0054129 A1 | 12/2001 | Wouters |
| 2002/0040361 A1 | 4/2002 | Tikkanen et al. |
| 2002/0042796 A1 | 4/2002 | Igakura |
| 2002/0062301 A1 | 5/2002 | Rudoff et al. |
| 2002/0116406 A1 | 8/2002 | Goldick |
| 2002/0152354 A1 | 10/2002 | Harmer |
| 2003/0028765 A1 | 2/2003 | Cromer et al. |
| 2003/0088587 A1 | 5/2003 | Merrells et al. |
| 2003/0105781 A1 | 6/2003 | Morris |
| 2003/0135650 A1 | 7/2003 | Kano et al. |
| 2003/0163802 A1 | 8/2003 | Takahashi |
| 2003/0177107 A1 | 9/2003 | Brown et al. |
| 2003/0182330 A1 | 9/2003 | Manley et al. |
| 2003/0182389 A1 * | 9/2003 | Edwards ............ G06F 17/30067 709/213 |

(56) References Cited

U.S. PATENT DOCUMENTS

| | | |
|---|---|---|
| 2003/0221095 A1 | 11/2003 | Gaunt et al. |
| 2003/0233385 A1 | 12/2003 | Srinivasa et al. |
| 2004/0003289 A1 | 1/2004 | Bhogal et al. |
| 2004/0030847 A1 | 2/2004 | Tremaine |
| 2004/0064483 A1 | 4/2004 | Bulka et al. |
| 2004/0078704 A1 | 4/2004 | Malueg et al. |
| 2004/0210706 A1 | 10/2004 | In et al. |
| 2004/0215600 A1 | 10/2004 | Aridor et al. |
| 2004/0250172 A1 | 12/2004 | Patel et al. |
| 2005/0015354 A1 | 1/2005 | Grubbs et al. |
| 2005/0027746 A1 | 2/2005 | Lin et al. |
| 2005/0060316 A1 | 3/2005 | Kamath et al. |
| 2005/0172005 A1 | 8/2005 | Goodwin |
| 2005/0246612 A1 | 11/2005 | Leis et al. |
| 2005/0256838 A1 | 11/2005 | Lasser |
| 2006/0020745 A1 | 1/2006 | Conley et al. |
| 2006/0095649 A1 | 5/2006 | Netter et al. |
| 2006/0136529 A1 | 6/2006 | Pudipeddi et al. |
| 2006/0224578 A1 | 10/2006 | Kadatch et al. |
| 2007/0136387 A1 | 6/2007 | Malueg et al. |
| 2007/0239957 A1 | 10/2007 | Lin |
| 2008/0091702 A1 | 4/2008 | Pudipeddi et al. |
| 2008/0168029 A1 | 7/2008 | Pudipeddi et al. |
| 2008/0172425 A1 | 7/2008 | Patel et al. |
| 2008/0172426 A1 | 7/2008 | Patel et al. |
| 2008/0177939 A1 | 7/2008 | Patel et al. |
| 2008/0215646 A1 | 9/2008 | Pudipeddi et al. |
| 2008/0215647 A1 | 9/2008 | Pudipeddi et al. |
| 2009/0164440 A1 | 6/2009 | Pudipeddi et al. |
| 2009/0164539 A1 | 6/2009 | Pudipeddi et al. |
| 2009/0265400 A1 | 10/2009 | Pudipeddi et al. |
| 2010/0049776 A1 | 2/2010 | Patel et al. |
| 2010/0217788 A1 | 8/2010 | Patel et al. |
| 2012/0011177 A1 | 1/2012 | Patel et al. |
| 2012/0011179 A1 | 1/2012 | Patel et al. |
| 2013/0080485 A1 | 3/2013 | Pudipeddi et al. |

FOREIGN PATENT DOCUMENTS

| | | |
|---|---|---|
| CN | 1790328 A | 6/2006 |
| EP | 0416445 A2 | 3/1991 |
| EP | 462587 A2 | 12/1991 |
| EP | 618540 A2 | 10/1994 |
| EP | 0733238 A1 | 9/1996 |
| EP | 1376405 A2 | 1/2004 |
| EP | 1677214 A1 | 7/2006 |
| JP | S6441039 A | 2/1989 |
| JP | H10315843 A | 12/1989 |
| JP | H02148341 A | 6/1990 |
| JP | H0317753 A | 1/1991 |
| JP | H04188239 A | 7/1992 |
| JP | H0619763 A | 1/1994 |
| JP | H06103140 A | 4/1994 |
| JP | H07234879 A | 9/1995 |
| JP | 2001160068 A | 6/2001 |
| JP | 2001325134 A | 11/2001 |
| JP | 2002099454 A | 4/2002 |
| JP | 2002132566 A | 5/2002 |
| JP | 2003162709 A | 6/2003 |
| JP | 2003345708 A | 12/2003 |
| JP | 2004288007 A | 10/2004 |
| KR | 100380955 B1 | 4/2003 |
| RU | 2159467 C2 | 11/2000 |
| RU | 2170454 C2 | 7/2001 |
| TW | 533377 B | 5/2003 |
| WO | 111486 A2 | 2/2001 |
| WO | 03088043 A1 | 10/2003 |

OTHER PUBLICATIONS

U.S. Appl. No. 15/411,376; Non-Final Office Action; dated Apr. 7, 2017; 10 pages.
"Office Action Issued in Norway Patent Application No. 20161346", dated Dec. 28, 2016, 5 Pages.
"Notice of Allowance Issued in Canadian Patent Application No. 2527060", dated Sep. 17, 2015, 1 Page.
"Office Action Issued in Canadian Patent Application No. 2527060", dated Sep. 5, 2012, 2 Pages.
"Office Action Issued in Canadian Patent Application No. 2527060", dated Mar. 25, 2014, 3 Pages.
"Decision on Appeal Issued in U.S. Appl. No. 11/229,485", dated Apr. 26, 2016, 6 Pages.
"Examination Answer Issued in U.S. Appl. No. 11/229,485", dated Oct. 23, 2013, 13 Pages.
"Final Office Action Issued in U.S. Appl. No. 11/229,485", dated Nov. 12, 2010, 17 Pages.
"Final Office Action Issued in U.S. Appl. No. 11/229,485", dated Jul. 16, 2008, 12 Pages.
"Final Office Action Issued in U.S. Appl. No. 11/229,485", dated Aug. 18, 2009, 9 Pages.
"Final Office Action Issued in U.S. Appl. No. 11/229,485", dated Oct. 17, 2012, 18 Pages.
"Non Final Office Action Issued in U.S. Appl. No. 11/229,485", dated Mar. 30, 2012, 20 Pages.
"Non Final Office Action Issued in U.S. Appl. No. 11/229,485", dated Nov. 7, 2007, 14 Pages.
"Non Final Office Action Issued in U.S. Appl. No. 11/229,485", dated Jan. 15, 2009, 11 Pages.
"Non Final Office Action Issued in U.S. Appl. No. 11/229,485", dated Feb. 22, 2010, 11 Pages.
"Notice of Allowance Issued in U.S. Appl. No. 11/229,485", dated Jul. 13, 2016, 8 Pages.
"Non Final Office Action Issued in U.S. Appl. No. 12/052,594", dated Aug. 6, 2010, 16 Pages.
"Non Final Office Action Issued in U.S. Appl. No. 12/052,594", dated Jun. 12, 2012, 21 Pages.
"Office Action Issued in Norway Patent Application No. 20056016", dated Mar. 26, 2014, 5 Pages.
"Office Action Issued in Russian Patent Application No. 2005134810", dated Dec. 14, 2009, 5 Pages. (w/o English Translation).
"Notice of Allowance Issued in U.S. Appl. No. 12/052,594", dated Jun. 24, 2016, 3 Pages.
"Notice of Allowance Issued in U.S. Appl. No. 12/052,594", dated Jun. 8, 2016, 5 Pages.
"Office Action Issued in Japanese Patent Application No. 2010-129852", dated Apr. 13, 2012, 4 Pages.
"Final Office Action Issued in U.S. Appl. No. 12/052,603", dated Apr. 15, 2011, 12 Pages.
"Final Office Action Issued in U.S. Appl. No. 12/052,603", dated Dec. 19, 2012, 13 Pages.
"Final Office Action Issued in U.S. Appl. No. 12/052,603", dated Jul. 16, 2014, 11 Pages.
"Non Final Office Action Issued in U.S. Appl. No. 12/052,603", dated Dec. 17, 2013, 13 Pages.
"Non Final Office Action Issued in U.S. Appl. No. 12/052,603", dated Jul. 6, 2012, 11 Pages.
"Non Final Office Action Issued in U.S. Appl. No. 12/052,603", dated Aug. 24, 2010, 11 Pages.
"Final Office Action Issued in U.S. Appl. No. 12/493,172", dated Apr. 24, 2012, 25 Pages.
"Final Office Action Issued in U.S. Appl. No. 12/493,172", dated Nov. 21, 2013, 20 Pages.
"Non Final Office Action Issued in U.S. Appl. No. 12/493,172", dated Mar. 14, 2013, 34 Pages.
"Non Final Office Action Issued in U.S. Appl. No. 12/493,172", dated Jun. 17, 2014, 23 Pages.
"Non Final Office Action Issued in U.S. Appl. No. 12/493,172", dated Aug. 31, 2011, 16 Pages.
"Notice of Allowance Issued in U.S. Appl. No. 12/493,172", dated Oct. 3, 2016, 5 Pages.
"Final Office Action Issued in U.S. Appl. No. 12/493,172", dated Dec. 29, 2014, 23 Pages.
"Final Office Action Issued in U.S. Appl. No. 14/075,525", dated May 1, 2015, 12 Pages.
"Non Final Office Action Issued in U.S. Appl. No. 14/075,525", dated Jul. 28, 2014, 10 Pages.

(56) References Cited

OTHER PUBLICATIONS

"Notice of Allowance Issued in U.S. Appl. No. 141075,525", dated Dec. 18, 2015, 11 Pages.
Yamamori, Takenori, "Guide to Rise Higher than a Novice, PC UNIX Deciphered from Boot Files", In Proceedings of Software Design, Issue 131, Gijutsu-Hyohron Co., Ltd., Sep. 18, 2001, pp. 110-121.
"Final Office Action Issued in U.S. Appl. No. 12/052,584", dated Nov. 19, 2012, 11 Pages.
"Office Action Issued in Israel Patent Application No. 172014", dated Oct. 15, 2013, 7 Pages.
"Final Office Action Issued in U.S. Appl. No. 12/052,584", dated Jan. 20, 2011, 19 Pages.
"Office Action Issued in Israel Patent Application No. 172014", dated Dec. 17, 2009, 4 Pages.
"Non Final Office Action Issued in U.S. Appl. No. 12/052,584", dated Feb. 29, 2012, 11 Pages.
"Non Final Office Action Issued in U.S. Appl. No. 12/052,584", dated Aug. 17, 2011, 10 Pages.
"Non Final Office Action Issued in U.S. Appl. No. 12/052,584", dated Jun. 14, 2010, 18 Pages.
"Notice of Allowance Issued in U.S. Appl. No. 12/052,584", dated Jul. 9, 2013, 6 Pages.
"Final Office Action Issued in U.S. Appl. No. 12/052,594", dated Jan. 17, 2013, 24 Pages.
"Final Office Action Issued in U.S. Appl. No. 12/052,594", dated Apr. 18, 2011, 23 Pages.
"European Search Report Issued in Patent Application No. 05111554.1", dated May 24, 2006, 8 Pages.
"Office Action Issued in European Patent Application No. 05111554.1", dated Feb. 12, 2007, 5 Pages.
"Office Action Issued in European Patent Application No. 05111554.1", dated Jun. 24, 2009, 4 Pages.
"Office Action Issued in European Patent Application No. 05111554.1", dated Dec. 20, 2007, 7 Pages.
"Office Action Issued in European Patent Application No. 10012810.7", dated Jul. 28, 2015, 4 Pages.
"European Search Report Issued in Application No. 10012811.5", dated Jan. 21, 2011, 11 Pages.
"Office Action Issued in European Patent Application No. 10012811.5", dated Dec. 21, 2011, 4 Pages.
"Office Action Issued in European Patent Application No. 10012811.5", dated Jul. 28, 2015, 4 Pages.
"Office Action Issued in Philippines Patent Application No. PH/1/2005/563", dated Aug. 26, 2008, 1 Page.
"Office Action Issued in Korean Patent Application No. 10-2005-0110061", dated Jun. 20, 2012, 4 Pages.
"Office Action Issued in Philippines Patent Application No. PH/1/2005/563", dated Apr. 29, 2011, 1 Page.
"Office Action Issued in Korean Patent Application No. 10-2010-0112978", dated Jun. 20, 2012, 7 Pages.
"Office Action Issued in Philippines Patent Application No. PH/1/2011/219", dated Oct. 21, 2011, 1 Page.
"Office Action Issued in Taiwan Patent Application No. 102144605", dated Nov. 24, 2015, 7 Pages.
"Office Action Issued in Philippines Patent Application No. PH/1/2011/219", dated Oct. 27, 2014, 1 Page.
"Office Action Issued in Indonesian Patent Application No. P00201100295", dated Sep. 28, 2012, 1 Page.
"Office Action Issued in Malaysian Patent Application No. PI 20055510", dated Jun. 29, 2012, 4 Pages.
"Office Action Issued in Canadian Patent Application No. 2,820,339", dated Apr. 28, 2015, 5 Pages.
"Second Office Action and Search Report Issued in Chinese Patent Application No. 201210063035.0", dated Sep. 2, 2014, 13 Pages.
"Notice of Allowance Issued in Chinese Patent Application No. 201210063035.0", dated Feb. 12, 2015, 4 Pages.
"Corrected Office Action Issued in Singapore Patent Application No. 200507941-3", dated Nov. 12, 2007, 8 Pages.
"Office Action Issued in Singapore Patent Application No. 200507941-3", dated Feb. 19, 2007, 7 Pages.
"First Office Action Issued in Chinese Patent Application No. 200510125054.1", dated Jul. 4, 2008, 7 Pages.
"Notice of Allowance Issued in Chinese Patent Application No. 200510125054.1", dated Dec. 20, 2011, 4 Pages.
"Second Office Action Issued in Chinese Patent Application No. 200510125054.1", dated Jan. 15, 2010, 8 Pages.
"Third Office Action Issued in Chinese Patent Application No. 200510125054.1", dated Jul. 13, 2011, 6 Pages.
"Notice of Allowance Issued in Russian Patent Application No. 2005134810", dated Dec. 17, 2010, 17 Pages.
"Office Action Issued in Australian Patent Application No. 2011200838", dated May 18, 2011, 1 Page.
"Notice of Allowance Issued in Australian Patent Application No. 2005229678", dated Nov. 11, 2010, 3 Pages.
"Office Action Issued in Australian Patent Application No. 2005229678", dated May 17, 2010, 1 Page.
"Notice of Allowance Issued in Japanese Patent Application No. 2005-364036", dated Apr. 10, 2012, 6 Pages.
"Office Action Issued in Japanese Patent Application No. 2005-364036", dated Jun. 3, 2011, 6 Pages.
"Office Action Issued in Japanese Patent Application No. 2005-364036", dated Oct. 25, 2011, 4 Pages.
"Office Action Issued in Norway Patent Application No. 20056016", dated Jan. 27, 2015, 1 Page.
"First Office Action Issued in Chinese Patent Application No. 201010189026.7", dated Nov. 25, 2010, 8 Pages.
"Notice of Allowance Issued in Chinese Patent Application No. 201010189026.7", dated Apr. 18, 2012, 4 Pages.
"Notice of Allowance Issued in Australian Patent Application No. 2011200838", dated Sep. 5, 2011, 2 Pages.
"Notice of Allowance Issued in Japanese Patent Application No. 2010-129852", dated Feb. 19, 2013, 6 Pages.
"Office Action Issued in Japanese Patent Application No. 2010-129852", dated Sep. 7, 2012, 4 Pages.
"Office Action Issued in Indian Patent Application No. 3021/DEL/2005", dated Jan. 5, 2015, 1 Page.
"Notice of Allowance Issued in New Zealand Patent Application No. 543640", dated May 8, 2007, 1 Page.
"Office Action and Search Report Issued in Taiwan Patent Application No. 094139703", dated Oct. 5, 2012, 10 Pages.
"Office Action Issued Canadian Patent Application No. 2820339", dated Apr. 28, 2015, 5 Pages.
"Notice of Allowance Issued in Malaysian Patent Application No. PI 20055510", dated Jun. 13, 2014, 2 Pages.
"Notice of Allowance Issued in Indonesian Patent Application No. P00200500645", dated May 11, 2011, 6 Pages.
"Office Action Issued in Indonesian Patent Application No. P00200500645", dated May 14, 2010, 2 Pages.
"Notice of Allowance Issued in Indonesian Patent Application No. P00201100295", dated Feb. 11, 2013, 10 Pages.
"Notice of Allowance Issued in Japanese Patent Application No. 2012-040595", dated Oct. 1, 2013, 3 Pages.
"Office Action Issued in Japanese Patent Application No. 2012-040595", dated Mar. 26, 2013, 4 Pages.
"First Office Action and Search Report Issued in Chinese Patent Application No. 201210063035.0", dated Jan. 26, 2014, 11 Pages.
"Above Software Introduces Golden Retriever2.Ob", In Proceedings of News Release, Dateline: Irvine, California, Mar. 29, 1993, 1 Page.
"File Sharing Protocol", In Proceedings of Microsoft Corporation, Nov. 7, 1988, 69 Pages.
"Notice of Allowance Issued in Japanese Patent Application No. 2013-000671", dated Feb. 4, 2014, 3 Pages.
"Office Action Issued in Japanese Patent Application No. 2013-000671", dated Oct. 15, 2013, 4 Pages.
"Long Filenames", In Proceedings of Windows 95 Beta 2 Release SDK, Article 15, Oct. 28, 1994, pp. 19-47.
"The Intelligent Way to Search", In Proceedings of News Release, Oct. 1987, 1 Page.

(56) References Cited

OTHER PUBLICATIONS

"World Software Corporation (WSC) Launches Extend-a-name in Europe", In Proceedings of Computer Product Update, LexisNexis, ISSN: 0267-9086, Jul. 27, 1990, 2 Pages.
Ray, Duncan, "Power Programming Using Long Filenames and Extended Attributes, Part I", In Journal PC Magazine, vol. 9, Issue 8, Apr. 24, 1990, 6 Pages.
"Notice of Allowance Issued in European Patent Application No. 05111554.1", dated Mar. 14, 2014, 5 Pages.
Rohan, R, "Golden Retriever Fetches Files in Windows", In Proceedings of Computer Shopper, vol. 12, Issue 11, Nov. 1992, 2 Pages.
Shirasaki, Hiroo, "Observe the Boot Process of FreeBSD 14", In Unix Magazine, vol. 20, Issue 2, ASCII Corporation, Feb. 1, 2005, pp. 91-99.
"Office Action Issued in Indian Patent Application No. 3021/DEL/2005", dated Dec. 19, 2013, 1 Page.
Tanenbaum, et al., "Chapter 5: File System", In Book MINIX Operating System, Published by Keiichiro Sakamoto, ASCII, Inc., Apr. 21, 1989, 12 Pages.
"European Search Report Issued in Application No. 10012810.7", dated Jan. 21, 2011, 5 Pages.
"Notice of Allowance Issued in Taiwan Patent Application No. 094139703", dated Nov. 6, 2013, 4 Pages.
"Office Action Issued in European Patent Application No. 10012810.7", dated Jan. 5, 2012, 7 Pages.
Tanenbaum, Andrew S., "Chapter 6: File Systems", In Book Modern Operating Systems, Second Edition, Published by Prentice Hall International, Mar. 3, 2001, pp. 379-380.
Bonner, Paul, "Build a Document Manager Under Windows", In Proceedings of PC/Computing, vol. 4, No. 12, Dec. 1991, 10 Pages.
Bonner, Paul, "What's in a Name?", In Proceedings of PC-Computing, vol. 2, Issue 9, Sep. 1989, 2 Pages.
Duncan, Ray, "Design Goals and Implementation of the New High Performance File System", In Journal Microsoft System, vol. 4, Issue 5, Sep. 1989, 14 Pages.
Duncan, Ray, "Power Programming Using Long Filenames and Extended Attributes, Part II", In Journal PC Magazine, vol. 9, Issue 9, May 15, 1990, 6 Pages.
Glass, Brett, "Create Your Own Environment", In Proceedings of PC-Computing vol. 3, Issue 10, Oct. 1990, 5 Pages.
Gooch, et al., "Overview of the Linux Virtual File Systems", Retrieved From <<https://www.kernel.org/doc/Documentation/filesystems/vfs.txt>>, Jun. 24, 2007, 18 Pages.
Hurwicz, Mike, "MS-DOS 3.1 Makes It Easy to Use IBM PCs on a Network", In Journal Data Communications, Telco Research Inc., Nov. 1985, pp. 223-237.
Karpovich, et al., "Breaking the I/O Bottleneck at the National Radio Astronomy Observatory (NRAO)", In Technical Report CS-94-37, University of Virginia, Department of Computer Science, Sep. 1993, 43 Pages.
Karpovich, et al., "Extensible File System (ELFS): An Object-Oriented Approach to High Performance File I/O", In Proceedings of the Ninth Annual Conference on Object-Oriented Programming Systems, Language, and Applications, Jul. 22, 1994, pp. 191-204.
Khalidi, et al., "Extensible File System in Spring", In technical Report SMLI TR-93-18, Published by Sun Microsystems Laboratories, Inc., Sep. 1993, 18 Pages.
Leffler, et al., "Chapter 2: Design Overview of 4.3BSD", In Book: The Design and Implementation of the 4.3BSD UNIX Operating System, Published by Addison-Wesley Publishing Company, 1989, pp. 34-36.
Lent, et al., "New Improved Windows", In Proceedings of PC World, vol. 11, No. 12, Dec. 1993, pp. 252-272.
Mallory, Jim, "Breakthrough on DOS filename limits—Above Software Introduces Golden Retriever 2.0b", Retrieved from<< http://calbears.findarticles.com/p/articles/mi_m0NEW/is_1993_April_12/ai_13786607/print>>, Apr. 12, 1993, 1 Page.

McCormick, John, "Presentation Manager under OS/2 Encourages Lengthy Name-Calling", In Proceedings of Government Computer News, vol. 9, Issue 10, May 14, 1990, 2 Pages.
"Notice of Allowance Issued in Mexican Patent Application No. MX/a/2010/012831", dated Sep. 9, 2013, Pages. (w/o English Translation).
Tanenbaum, Andrew S., "Chapter 6: File Systems and Chapter 11: Case Study 2: Windows 2000 763", In Book Modern Operating Systems, Second Edition, Published by Prentice Hall International, Mar. 3, 2001, 18 Pages.
O'Malley, Chris, "Fetching Desktop Files: Standalone Document Managers", In Proceedings of Windows Sources, vol. 1, Issue 2, Mar. 1993, 2 Pages.
Trivette, Donald B., "Utility Provides 60-Character Filenames", In PC Magazine vol. 7, Issue 16, Sep. 27, 1988, 1 Page.
Wang, Y.E Gail, "Universal File Names for Ada", In Proceedings of Ada Letters vol. X, Issue 1, Jan. 1990, 111-117.
"Office Action and Search Report Issued in Norway Patent Application No. 20151214", dated Oct. 27, 2015, 5 Pages.
"Office Action Issued in Brazil Patent Application No. PI0505077-4", dated Jul. 17, 2017, 7 Pages.
Brazil Patent Application No. PI0505077-4; Office Action; dated Jul. 17, 2017; 9 pages.
Bob Eager; "Implementation of extended attributes on the FAT filed"; Tavi Systems; © 2000; 3 pages.
"Universal Disk Format® Specification"; Revision 2.50; Apr. 30, 2003; Optical Storage Technology Association; 165 pages.
European Patent Application No. 05111554.1; Notice of Opposition; dated Feb. 11, 2015; 38 pages.
European Patent Application No. 05111554.1; Translation of Notice of Opposition; dated Feb., 3, 2015; 23 pages.
European Patent Application No. 05111554.1; Decision on Appeal; dated Sep. 20, 2017; 43 pages.
European Patent Application No. 05111554.1; Letter from Opponent—Withdrawn; dated Apr. 18, 2018; 2 pages.
Andrew S. Tanenbaum; "Modern Operating Systems"; Second Edition; Prentice Hall Intl; ©2001; p. 442-445 and p. 830-841.
China Patent Application No. 201210063035.0; Decision on the Request for Invalidation of Patent Right; dated Apr. 18, 2016; 58 pages.
China Patent Application No. 201210063035.0; Administrative Pleadings; dated Apr. 18, 2016; 54 pages.
"Office Action Issued in European Application No. 10012810.7", dated Sep. 21, 2018, 4 Pages.
"Office Action Issued in European Application No. 10012811.5", dated Sep. 20, 2018, 5 Pages.
"Non Final Office Action Issued in U.S. Appl. No. 14/842,963", dated Sep. 21, 2018, 35 Pages.
Muthitacharoen, et al., "A low-bandwidth network file system", 18th ACM Symposium on Operating Systems Principles, 2001, 14 Pages.
"Flush", In Microsoft Press Computer Dictionary, Third Edition, 1997, 1 Page.
"Fragmentation", In Microsoft Press Computer Dictionary, Third Edition, 1997, 1 Page.
Shullich, et al., "Reverse Engineering the Microsoft exFAT File System", Retrieved from https://www.sans.org/reading-room/whitepapers/forensics/reverse-engineering-microsoft-exfat-file-system-33274, Dec. 1, 2009, 86 Pages.
"Transactional File Access", In Proceedings of the Commons Transactions by Apache Commons, Version: 1.3- SNAPSHOT, Jun. 2, 2005, 1 Page.
"Transaction-Safe FAT File System", Retrieved from: https://msdn.microsoft.com/en-us/library/aa516909.aspx, May 30, 2006, 1 Page.
"Office Action Issued in European Patent Application No. 05111554.1", dated Sep. 23, 2010, 14 Pages.
"Office Action Issued in European Patent Application No. 05111554.1", dated Jul. 18, 2013, 13 Pages.
"Oral Hearing Issued in European Patent Application No. 05111554.1", dated Oct. 6, 2015, 10 Pages.
"Office Action Issued in Taiwan Patent Application No. 102144605", dated Aug. 19, 2016, 4 Pages. (W/o English Translation).

(56) References Cited

OTHER PUBLICATIONS

"Non-Final Office Action Issued in U.S. Appl. No. 11/752,872", dated Nov. 12, 2009, 7 Pages.
"Non Final Office Action Issued in U.S. Appl. No. 11/752,872", dated Jul. 23, 2009, 5 pages.
"Final Office Action Issued in U.S. Appl. No. 12/389,391", dated Feb. 21, 2013, 10 Pages.
"Non Final Office Action Issued in U.S. Appl. No. 12/389,391", dated Jul. 31, 2012, 8 Pages.
"Non Final Office Action Issued in U.S. Appl. No. 12/389,391", dated Apr. 14, 2011, 12 Pages.
"Non Final Office Action Issued in U.S. Appl. No. 12/389,396", dated Oct. 31, 2011, 12 Pages.
"Office Action Issued in Philippines Patent Application No. 1-2011-000219", dated Feb. 12, 2018, 2 Pages.
"Final Office Action Issued in U.S. Appl. No. 13/006,063", dated May 30, 2012, 8 Pages.
"Non Final Office Action Issued in U.S. Appl. No. 13/006,063", dated Dec. 22, 2011, 7 Pages.
"Final Office Action issued in U.S. Appl. No. 13/006,063", dated Apr. 27, 2011, 5 Pages.
"Non Final Office Action Issued in U.S. Appl. No. 13/006,088", dated Dec. 21, 2011, 8 Pages.
"Non Final Office Action Issued in U.S. Appl. No. 13/006,088", dated May 18, 2011, 8 Pages.
"Non Final Office Action Issued in U.S. Appl. No. 13/162,189", dated Nov. 10, 2011, 7 Pages.
"Non Final Office Action Issued in U.S. Appl. No. 13/685,018", dated Nov. 23, 2015, 18 Pages.
"Final Office Action Issued in U.S. Appl. No. 13/875,386", dated Jul. 30, 2013, 10 Pages.
"Final Office Action Issued in U.S. Appl. No. 13/901,997", dated Jan. 14, 2014, 6 Pages.
"Non Final Office Action Issued in U.S. Appl. No. 13/901,997", dated Jul. 15, 2013, 6 Pages.
"Final Office Action Issued in U.S. Appl. No. 14/099,307", dated Jun. 17, 2016, 12 Pages.
"Non-Final Office Action Issued in U.S. Appl. No. 14/099,307", dated Apr. 8, 2015, 11 Pages.
"Non-Final Office Action Issued in U.S. Appl. No. 14/099,307", dated Oct. 23, 2015, 10 Pages.
"Non Final Office Action Issued in U.S. Appl. No. 14/456,419", dated Jan. 15, 2015, 6 Pages.
"Non-Final Office Action Issued in U.S. Appl. No. 14/815,076", dated Feb. 26, 2016, 7 Pages.
"Non Final Office Action Issued in U.S. Appl. No. 14/842,963", dated Jan. 10, 2018, 34 Pages.
"Non Final Office Action Issued in U.S. Appl. No. 15/411,376", dated May 22, 2018, 8 Pages.
"Office Action Issued in Translation) Israel Patent Application No. 172014", dated Aug. 31, 2014, 1 Page. (W/o English Translation).
"Office Action Issued in Russian Patent Application No. 2005134810", dated Sep. 11, 2005, 5 Pages.
"Office Action Issued in Russian Patent Application No. 2005134810", dated Oct. 12, 2010, 4 Pages. (W/o English Translation).
"Office Action Issued in Russian Patent Application No. 2010119961", dated Feb. 17, 2015, 5 Pages. (W/o English Translation).
"Office Action Russian Patent Application No. 2011106779", dated Feb. 6, 2015, 3 Pages. (W/o English Translation).
"Office Action Issued in Chile Patent Application No. 2936-05", dated Nov. 11, 2005, 6 Pages.
"Office Action Issued Taiwan Patent Application No. 94139703", dated Mar. 25, 2013, 3 Pages. (W/o English Translation).
Amy, Rich, "ZFS, Sun's Cutting-Edge File System (Part 1: Storage Integrity, Security, and Scalability)", In Technical Report, Sun Microsystems, BigAdmin System Administration Portal, Aug. 2006, 8 Pages.
Barreto, et al., "A Highly Available Replicated File System for Resource-Constrained Windows CE .Net Devices", In Proceedings of the 3rd International Conference on .Net Technologies, May 30, 2005, 6 Pages.
Chen, et al., "The Rio File Cache: Surviving Operating System Crashes", In Proceedings of the ACM SIGPLAN Notices, vol. 31, Issue 9, Oct. 1, 1996, 11 Pages.
Chiung-San, Lee, "Server-Based Maintenance Approach for Computer Classroom Workstations", In Proceedings of the IEICE Transactions on Information and Systems, vol. 83, Issue 4, Apr. 25, 2000, pp. 807-814.
De Jonge, et al., "The Logical Disk: A New Approach to Improving File Systems", In Proceedings of the Fourteenth ACM Symposium on Operating Systems Principles, Dec. 1993, 14 Pages.
Farr, et al., "An Optimum Disc Organization for a Virtual Memory System", In Proceedings of the Computer Decisions, Jun. 1971, 7 Pages.
Kashyap, Aditya, "File System Extensibility and Reliability Using an in-Kernel Database", A Thesis Presented to The Graduate School in partial fulfillment of the Requirements for the degree of Master of Science in Computer Science, Stony Brook University, Dec. 2004, 30 Pages.
"Office Action Issued in Mexico Patent Application No. MX/a/2010/012831", dated Mar. 22, 2013, 4 Pages. (W/o English Translation).
Otoo, et al., "Non-shared Disk Cluster-A Fault Tolerant, Commodity Approach to Hi-Bandwidth Data Analysis", Retrieved from http://citeseerx.ist.psu.edu/viewdoc/download?doi=10.1.1.133.7039&rep=rep1&type=pdf, Sep. 2001, 6 Pages.
"Office Action Issued in Mexican Patent Application No. PA/a/2005/012405", dated Mar. 10, 2010, 4 Pages.
"Office Action Issued in Mexican Patent Application No. PA/a/2005/012405", dated May 6, 2009, 2 Pages. (W/o English Translation).
Sivathanu, et al., "Life or Death at Block-Level", In Proceedings of the 6th Symposium on Operating Systems Design and Implementation, vol. 4, Dec. 6, 2004, 16 Pages.
"Non-Final Office Action Issued in U.S. Appl. No. 15/380,341", dated Jun. 20, 2019, 6 Pages.
"Final Office Action Issued in U.S. Appl. No. 14/842,963", dated Jun. 11, 2019, 7 Pages.

* cited by examiner

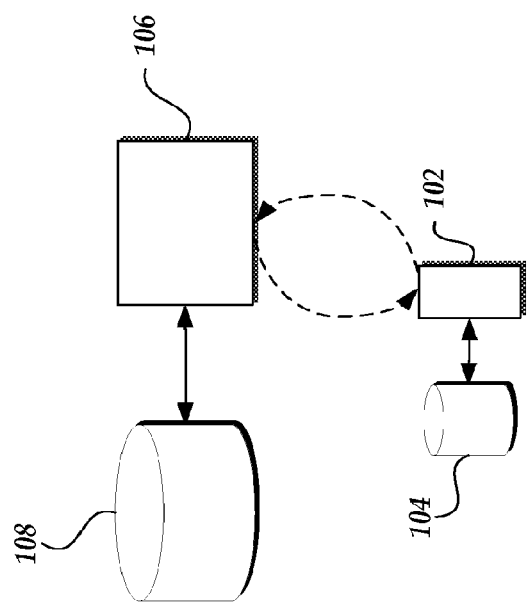
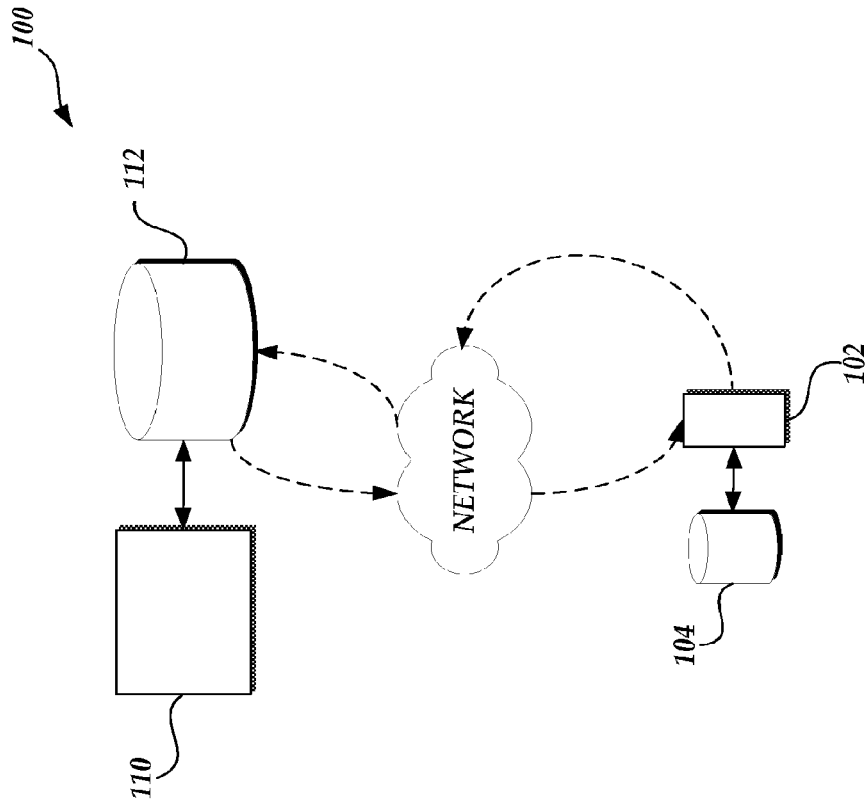
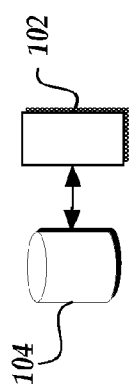

Fig.4.

| NAME | SIZE |
|---|---|
| OEM NAME | 3 |
| DATA SIZE DESCRIPTORS | X |
| ACTIVE FAT | 2 |
| VOLUME SERIAL NUMBER | 4 |
| FILE SYSTEM TYPE | X |

| NAME | SIZE |
|---|---|
| IN USE | 1:1 |
| TYPE | 1:7 |
| SECONDARY ENTRIES | 1 |
| ATTRIBUTES | 2 |
| TIME | X |
| TIME ZONE | 1 |

| NAME | SIZE |
|---|---|
| IN USE | 1:1 |
| TYPE | 1:7 |
| CHARACTERS | 1 |
| NAME HASH | 2 |
| FILE NAME | 28 |

| NAME | SIZE |
|---|---|
| IN USE | 1:1 |
| TYPE | 1:7 |
| SECONDARY ENTRIES | 1 |
| GUID | 16 |

| NAME | SIZE |
|---|---|
| IN USE | 1:1 |
| TYPE | 1:7 |
| SECONDARY ENTRIES | 1 |
| GUID | 16 |
| OTHER | X |

| NAME | SIZE |
|---|---|
| IN USE | 1:1 |
| TYPE | 1:7 |
| GUID | 16 |
| OTHER | X |

| NAME | SIZE |
|---|---|
| IN USE | 1:1 |
| TYPE | 1:7 |
| ACL INFORMATION | X |

- 1000
- 1002
- 1004
- 1006

EXTENSIBLE FILE SYSTEM

CROSS REFERENCE TO RELATED APPLICATIONS

This application is a continuation of U.S. patent application Ser. No. 12/493,172, filed on Jun. 27, 2009, which is a continuation of and claims the benefit of U.S. patent application Ser. No. 11/229,485 entitled EXTENSIBLE FILE SYSTEM and filed on Sep. 16, 2005, and further claims the benefit of U.S. Provisional Application No. 60/637,407, entitled FILE SYSTEM FORMAT FOR PORTABLE MEDIA, and filed on Dec. 17, 2004. U.S. Provisional Application No. 60/637,407 is incorporated by reference herein.

BACKGROUND

Generally described, there are a number of portable computing devices, such as digital still cameras, digital video cameras, media players, mobile phones, mobile computing devices, personal digital assistants, and the like that maintain data on a storage media, such as a portable storage media. The continued development of more complex portable computing devices and larger storage capacity portable storage media places a greater demand for flexibility on the file system format used on the storage media. Current file system format approaches can become deficient in that they may provide adequate flexibility for increasing storage size capacities and/or storage media applications.

SUMMARY

An extensible file system format for portable storage media is provided. The extensible file system format includes the specification of primary and secondary directory entry types that may be custom defined. The primary and secondary directory entry types can be further classified as critical and benign directory entries.

In accordance with an aspect of the present invention, a computer readable medium having computer executable components for storing data is provided. The computer readable components can include a boot parameters component for specifying boot parameters for a file system. The computer readable components also include a file allocation table component for defining a file allocation table associated with the file system. Additionally, the computer readable components include a primary directory entry component for specifying data in a root directory of the file system. Still further, the computer readable components include at least one secondary entry component corresponding to the primary directory entry component. The secondary entry component defines defining meta data associated with the primary directory entry component. The primary and secondary directory entry components can be further classified as critical or benign.

In accordance with another aspect of the present invention, a computer readable medium having computer executable components for storing data is provided. The computer readable components include a boot parameters component for specifying boot parameters for a file system. The computer readable components also include a file allocation table component for defining a file allocation table associated with the file system. Still further, the computer readable components include a root directory component for specifying data in a root directory of the file system. Additionally, the computer readable components include at least extensible one meta data component corresponding to the root directory entry component. The meta data component defines meta data associated with the root directory component.

In an illustrative embodiment, a file system will not mount a volume for a critical primary or root directory entry that is not recognized. The file system can ignore benign primary directory entries, critical secondary directory entries and benign secondary directory entries that are not recognized.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 1A-1C are block diagrams illustrative of an illustrative environment including a portable computing device and a storage device implementing the extensible file system format in accordance with an aspect of the present invention;

FIG. 4 is a block diagram illustrative of data components for implementing a boot process block in an extensible file system format in accordance with an aspect of the present invention;

FIG. 5 is a block diagram illustrative of data components for implementing directory entries in an extensible file system format in accordance with an aspect of the present invention FIG. 6 is a block diagram illustrative of data components for implementing a file name and extensions in an extensible file system format in accordance with an aspect of the present invention;

FIG. 7 is a block diagram illustrative of data components for implementing a volume identifier in an extensible file system format in accordance with an aspect of the present invention;

FIG. 8 is a block diagram illustrative of data components for implementing an extensible directory entry in an extensible file system format in accordance with an aspect of the present invention;

FIG. 9 is a block diagram illustrative of data components for implementing an extensible directory entry in an extensible file system format in accordance with an aspect of the present invention;

FIG. 10 is a block diagram illustrative of data components for implementing an access control list in an extensible file system format in accordance with an aspect of the present invention.

DETAILED DESCRIPTION OF ILLUSTRATIVE EMBODIMENTS

Figure 2:
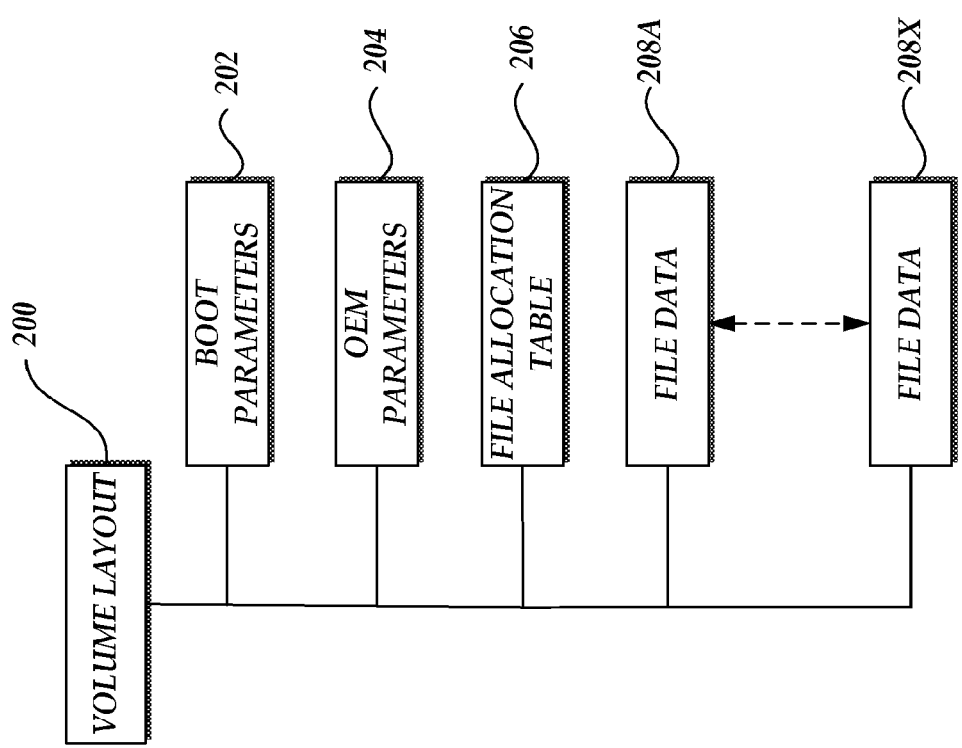
FIG. 2 is a block diagram illustrative of various volume layout components corresponding to an extensible file system format in accordance with an aspect of the present invention.

Generally described, the present invention relates to an extensible file system format and various processes associated with the extensible file system format. In an illustrative embodiment, the extensible file system format corresponds to an extensible file system format for portable storage media and various processes associated with the extensible file system format on the portable storage media. Although the present invention will be described with regard to a portable storage media file system format, one skilled in the relevant art will appreciate that the disclosed embodiments are illustrative in nature and should not be construed as limiting. Additionally, one skilled in the relevant art will appreciate that the data structures and data layouts used in the illustrative examples may require additional information related to performance, security, and the like.

FIGS. 1A-1C are block diagrams illustrative of various operating environments 100 for the extensible file system format of the present invention. With reference to FIG. 1A, in an illustrative embodiment, the extensible file system format is utilized to store data from a computing device, such as a mobile computing device 102, and a storage media, such as a portable storage media 104. In an illustrative embodiment, the mobile computing device 102 can correspond to any one of a variety of computing devices, including but not limited to, portable computing devices, mobile telephones, personal digital assistants, music players, media players. The portable storage media can also include, but is not limited to, hard drives, flash media, micro-drives and other storage media. In an illustrative embodiment, the extensible file system on the portable storage media 104 does not have to include any type of executable or readable software components, such as an operating environment, utilized by the mobile computing device 102. Alternatively, the extensible file system on the portable storage media 104 may include executable or readable software components used by the mobile device 102.

In an illustrative embodiment, the mobile computing device 102 may be in communication with other computing devices for collecting/exchanging data to be stored on the portable storage media 104. With reference to FIG. 1B, the mobile computing device 102 may be in direct communication with another computing device 106 and storage media 108. In an illustrative embodiment, the direct communication can correspond to various wired and wireless communication methods. In an illustrative embodiment, the other storage media 108 is not required to be formatted in accordance with the extensible file system format of the present invention. With reference to FIG. 1C, in a similar manner, the mobile computing device 102 may also be in communication with another computing device 110 and storage media 112, via a network connection. In an illustrative embodiment, the network connection can correspond to local area network (LAN) and wide are network (WAN) connections.

With reference now to FIG. 2, an illustrative embodiment volume layout 200 for an extensible file system format will be described. The volume layout 200 includes a boot parameters component 202 that include various information related to a description of the file system parameters of the partition. In an illustrative embodiment, the boot parameters component 202 can include code for bootstrapping from a defined partition, fundamental file system parameters for the defined partition, and various error checking information. A data structure for defining at least a portion of the boot parameters will be described below with regard to FIG. 4.

The volume layout 200 also includes an extensible parameters component, designated as OEM parameters 204, that define various additional data structures used in conjunction with the file system. In an illustrative embodiment, an original equipment manufacture (OEM) may specify various extensible data structures, such as performance parameters for a storage medium, that can be defined at time of manufacture. The volume layout 200 can further include a file allocation table component 206 that defines file and directory allocations. In an illustrative embodiment, each entry in the file allocation table component 206 corresponds to a 32 bit entry that represents an allocated cluster, an unallocated cluster or an unusable cluster. The volume layout 200 can still further include series of file data components 208A-208X that correspond to the data stored according to the file system format. Various data structures for defining a portion of the file data components 208A-208X will be defined with regard to FIGS. 3-10.

Figure 3:
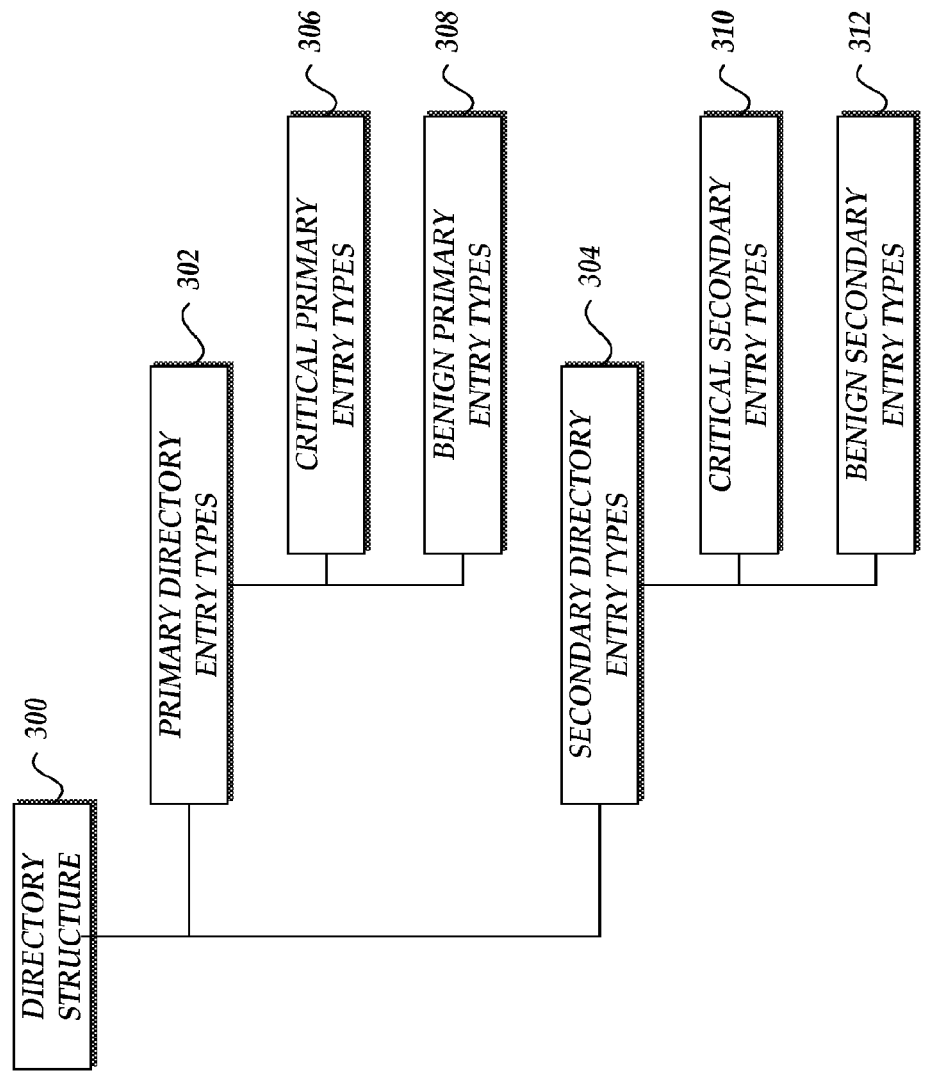
FIG. 3 is a block diagram illustrative of an extensible file system directory structures including primary and secondary directory entry structures in accordance with an aspect of the present invention.

Turning now to FIG. 3, in one aspect, the file data components 208 may include one or more directory entries according to a directory structure 300. In an illustrative embodiment, directory structure 300 is organized into primary directory entries 302 and secondary directory entries 304. Each directory entry in the primary and secondary entries is typed. For example, in an illustrative embodiment, type values for the primary and secondary directory entries can correspond to a range of 1 255. Primary directory entries 302 correspond to the entries in the root directory of the file system. Secondary directory entries 304 follow a primary directory entry and are associated with the primary directory entry. Secondary directory entries extend the metadata associated with the correlated primary directory entry.

With continued reference to FIG. 3, in an illustrative embodiment, the primary directory entries 302 can be further classified as critical primary directory entries 306 and benign primary directory entries 308. Critical primary directory entries 306 define potentially different formats for each directory entry. In an illustrative embodiment, an operating environment will not mount a volume corresponding to the extensible file system format with an unknown critical primary directory entry, as will be described below. Examples of known primary directory entries 306 can include allocation bitmaps, up case tables, volume labels, encryption keys, and normal directory entries. Benign primary directory entries 308 also define potential different formats for each directory entry, but can be ignored by the file system if a particular benign primary directory entry is not understood. Benign primary directory entries 308 can be associated with another cluster chain the volume. Additionally, benign primary directory entries 308 can also be associated a number of secondary directory entries 304.

In a manner similar to primary directory entries 302, secondary directory entries 304 may also be further classified as critical secondary directory entries 310 and benign secondary directory entries 312. As described above, the critical secondary directory entries 310 and benign secondary directory entries 312 are associated with a benign primary directory entry and extend the metadata associated with the primary directory entry. Both the critical secondary directory entries 310 and the benign secondary directory entries 312 can be associated with another cluster chain the volume.

To mount a corresponding to the extensible file system format, the file system implements a mount volume procedure. In an illustrative embodiment, the mount volume procedure attempts to a look at a version number for the volume. If the version number is not understood (e.g., the version number is higher), the volume will not be mounted. During a normal directory enumeration, any critical primary directory entries not known by the file system will prevent the volume from being mounted. Thereafter, various user initiated processes, such as a file open, will cause the file system to enumerate the secondary directory entries. If the critical secondary directory entries 310 are not known by a file system, the entire directory entry will be skipped. Additionally, if benign secondary directory entries 312 are not known by the file system, the particular unknown benign secondary directory entry will be ignored.

With reference now to FIG. 4, a block diagram illustrative of data components 400 for implementing a boot process block in the boot parameters component 202 (FIG. 2) will be described. The data components 400 include an OEM name component 402 for specifying a name for the file system format of the storage media. The data components 400 also include a data size descriptor component 404 for specifying various characteristics of the data stored in the file system. For example, the data size descriptor component 404 can specify a count of bytes per sector, a number of sectors per allocation unit, a FAT table offset, and a count of sectors for all data structures. The data components include an active FAT flags component 406 for specifying a number of active FATs on the file system. In an illustrative embodiment, a file system may support multiple FATs for utilization with some operating system environments. The data components 400 can further include a volume identification component 408 for identifying a volume serial number and/or version number. Still further, the data components 400 can include a file system type for specifying the file system format for the file system. One skilled in the relevant art will appreciate that the data components 400 can include a number of additional/alternative rows for implementing the above identified components 402 410 and additional components.

Turning now to FIG. 5, a block diagram illustrative of data components 500 for implementing directory entries in an extensible file system format will be described. Turning now to FIG. 6, a block diagram data components 500 for implementing a file name and extensions will be described. The data components 500 include an in use component 502 for specifying whether the particular directory entry is in use. In an illustrative embodiment, the high bit of the data components will be set to "1" if the directory entry is in use. The data components 500 further include a type designation component 504 for specifying that the directory entry is associated with a normal directory entry. The data components 500 further include a secondary directory entries component 504 for specifying a number of secondary entries associated with the normal directory entry. The data components 500 also include a file attributes component 508 for specifying various file system attributes for the directory entry. Still further, the data components 500 include a time component 510 for specifying various time information such as a creation timestamp, modification time stamp and other time information. Additionally, the data components 500 further include a time zone component 512 for specifying a time zone for the last created time stamp. One skilled in the relevant art will appreciate that the data components 500 can include a number of additional/alternative rows for implementing the above identified components 502 512 and additional components.

Turning now to FIG. 6, a block diagram data components 600 for implementing a file name and extensions will be described. The data components 600 include an in use component 602 for specifying whether the particular directory entry is in use. In an illustrative embodiment, the high bit of the data components will be set to "1" if the directory entry is in use. The data components 600 further include a type designation component 604 for specifying that the directory entry is associated with a file system name. The data components further include a file name length component 606 and a file name has component 608. The utilization of the file name hash component 608 will be described below. The data components 600 also include a file name component 610 for specifying the file name. One skilled in the relevant art will appreciate that the data components 600 can include a number of additional/alternative rows for implementing the above identified components 602 610 and additional components. Additionally, file name directory entries may be extended by secondary directory entries.

Turning now to FIG. 7, a block diagram illustrative of data components 700 for implementing a volume identifier in an extensible file system format is provided. The data components 700 include an in use component 702 for specifying whether the particular directory entry is in use. In an illustrative embodiment, the high bit of the data components will be set to "1" if the directory entry is in use. The data components 700 further include a type designation component 704 for specifying that the directory entry is associated with a volume identifier. The data components 700 further include a secondary directory entries component 706 for specifying a number of secondary entries associated with the volume identifier. The data components 700 also include a volume identifier 708, such as a global unique identifier. One skilled in the relevant art will appreciate that the data components 700 can include a number of additional/alternative rows for implementing the above identified components 702 708 and additional components. Additionally, in an illustrative embodiment, the data components 700 correspond to a benign directory entry that can be ignored by a file system that does not support volume identifiers.

With reference now to FIGS. 8 and 9, in an illustrative embodiment, parties, such as an OEM, may be able to define specific benign primary directory entry types 308 and benign secondary directory entry types 312. As discussed above, in the event the file system would not recognize or understand either the specific benign primary directory entry types 308 or benign secondary directory entry types 312, the file system could ignore the defined directory entry types.

With reference to FIG. 8, a block diagram illustrative of data components 800 for implementing an extensible benign primary directory entry 308 in an extensible file system format will be described. The data components 800 include an in use component 802 for specifying whether the particular directory entry is in use. In an illustrative embodiment, the high bit of the data components will be set to "1" if the directory entry is in use. The data components 800 further include a type designation component 804 for specifying that the directory entry is a benign primary directory entry. The data components 800 further include a secondary directory entries component 806 for specifying a number of secondary entries associated with the volume identifier. The data components 800 also include a volume identifier 808, such as a global unique identifier. The data components 800 can further include additional information 810, such as verification information and a starting cluster. One skilled in the relevant art will appreciate that the data components 800 can include a number of additional/alternative rows for implementing the above identified components 802 506 and additional components.

With reference to FIG. 9, a block diagram illustrative of data components 900 for implementing a benign secondary directory entry in an extensible file system format will be described. The data components 900 include an in use component 902 for specifying whether the particular directory entry is in use. In an illustrative embodiment, the high bit of the data components will be set to "1" if the directory entry is in use. The data components 900 further include a type designation component 904 for specifying that the directory entry is a benign primary directory entry. The data components 900 further include a secondary directory entries component 906 for specifying a number of secondary entries associated with the volume identifier. The data components 900 also include a volume identifier 908, such as a global unique identifier. The data components 900 can further include additional information 910, such as verification information and a starting cluster. One skilled in the relevant art will appreciate that the data components 900 can include a number of additional/alternative rows for implementing the above identified components 902 906 and additional components.

In an illustrative embodiment, a benign primary directory entry and/or secondary directory entries may be associated with access control list (ACL) information. FIG. 10 is a block diagram illustrative of data components 1000 for implementing an access control list in an extensible file system format. The data components 1000 include an in use component 1002 for specifying whether the particular directory entry is in use. In an illustrative embodiment, the high bit of the data components will be set to "1" if the directory entry is in use. The data components 1000 further include a type designation component 1004 for specifying that the directory entry is an ACL directory entry. The data components 1000 further include a number of ACL fields 1006, such as ACL flags, pointers to ACL databases, and the like. One skilled in the relevant art will appreciate that the data components 1000 can include a number of additional/alternative rows for implementing the above identified components 1002 1006 and additional components.

Figure 11:
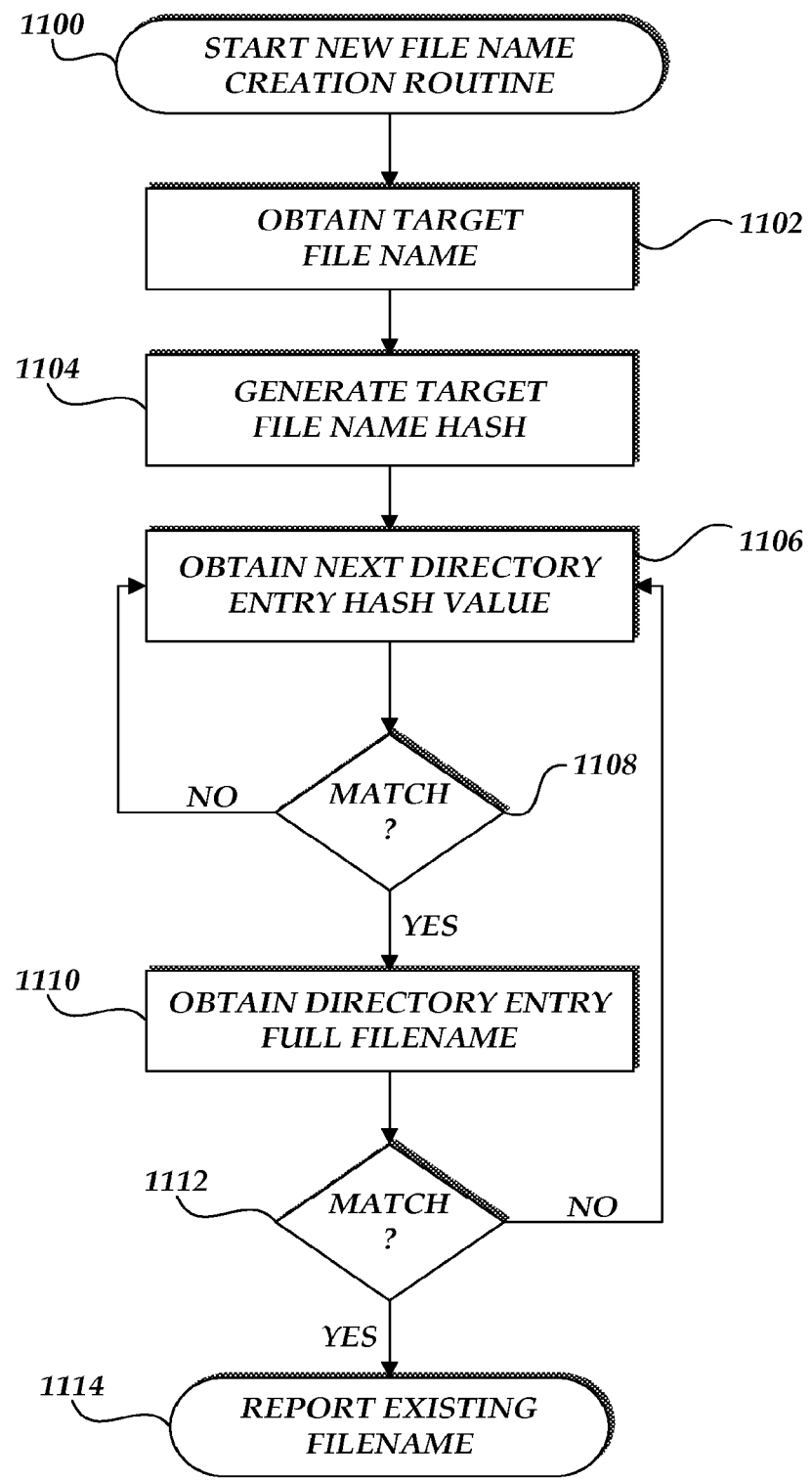
FIG. 11 is a flow diagram illustrative of a file name creation routine for an extensible file system format in accordance with an aspect of the present invention.

With reference now to FIG. 11, a file name creation routine 1100 for an extensible file system format will be described. At block 1102, a file system obtains a request to create a directory entry with a specific file name. In an illustrative embodiment, the specific file name can correspond to a naming convention, such as a digital camera picture naming convention. At block 1104, the file system generates a target name hash. At block 1106, an iterative loop is begun by examining the next directory entry hash value. An illustrative directory entry type for storing directory entry hash values is described above with regard to data components 600 (FIG. 6).

At decision block 1108, a test is conducted to determine whether the target hash value matches the current directory entry hash value. If they do not match, the routine 1100 returns to block 1106 (until all the directory entries have been examined. If the hash values match at decision block 1108, at block 1110, the file system obtains the full file name for the potentially matching directory entry. An illustrative directory entry type for storing directory entry full file names is described above with regard to data components 600 (FIG. 6). At decision block 1112, a test is conducted to determine whether the target file name matches the full file name of the potentially matching directory entry. If so, the routine 1100 terminates by reporting a conflict and the file system will be required to select a new file name. If the full file does not match, the routine 1100 will return to block 1106 to continue checking hash values for all the directory entries in the file system.

In accordance with an aspect of the present invention, various additional functionality may be added through the specification of specific directory types. For example, name streams may be supported by specifying a name stream directory entry. Additionally, on disk encryption may also be supported through the utilization of specific encryption algorithms and key exchanges. Still further, time zone conversions may be associated with directory entries to automatically convert a current time zone with a time zone with the directory entry was made.

While illustrative embodiments have been illustrated and described, it will be appreciated that various changes can be made therein without departing from the spirit and scope of the invention.

What is claimed:

1. A computing device comprising a file system and a computer readable storage medium that stores information within a volume on the computer readable storage medium, the volume comprising:
    a boot parameters component that specifies boot parameters for use by the file system;
    a file allocation table component containing a file allocation table for use by the file system; and
    a plurality of directory entries according to a directory structure, each of the plurality of directory entries are either a primary directory entry or a secondary directory entry, each of the plurality of directory entries is typed, wherein primary directory entries define potentially different formats,
        each secondary directory entry being associated with a primary directory entry and defining metadata extending the metadata of the associated primary directory entry, each primary directory entry being classified as either a critical primary directory entry or a benign primary directory entry, and each secondary directory entry being classified as either a critical secondary directory entry or a benign secondary directory entry, said secondary directory entries follow a primary directory entry;
    the file system ignores a benign primary directory entry, if it is not understood, and, when enumerating directory entries during a process of mounting the volume:
        prevents the volume from being mounted if the file system does not recognize the type of a critical primary directory entry; and
    thereafter, when performing user-initiated processes, enumerating the secondary directory entries, wherein
        the file system ignores a critical secondary directory entry and the primary directory entry with which it is associated if the file system does not recognize the type of said critical secondary directory entry, and
        the file system ignores a benign secondary directory entry if the file system does not recognize the type of said benign secondary directory entry.

2. The computing device recited in claim 1, wherein one of the critical primary directory entries contains an allocation bitmap defining storage media cluster availability.

3. The computing device recited in claim 1, wherein one of the directory entries contains a volume identifier.

4. The computing device recited in claim 1, wherein one of the primary directory entries contains a file name identifier.

5. The computing device recited in claim 1 further comprising a manufacturer data component for specifying manufacture data structures.

6. The computing device recited in claim 4, wherein the file name identifier comprises a full file name and a file name hash.

\* \* \* \* \*